A. W. KAUFMAN.
UTENSIL HANDLE.
APPLICATION FILED MAY 7, 1917.

1,263,428.

Patented Apr. 23, 1918.

INVENTOR
Adam W. Kaufman
By Morsell, Keeney & French,
ATTORNEYS

UNITED STATES PATENT OFFICE.

ADAM W. KAUFMAN, OF MILWAUKEE, WISCONSIN.

UTENSIL-HANDLE.

1,263,428.

Specification of Letters Patent.

Patented Apr. 23, 1918.

Application filed May 7, 1917. Serial No. 166,836.

*To all whom it may concern:*

Be it known that I, ADAM W. KAUFMAN, a citizen of the United States, and resident of Milwaukee, in the county of Milwaukee and State of Wisconsin, have invented new and useful Improvements in Utensil-Handles, of which the following is a description, reference being had to the accompanying drawings, which are a part of this specification.

The invention relates to utensil handles.

The invention is more particularly designed to provide a handle for utensils in which the bails or attaching arms are secured to the handle through an interlocking connection which cannot be unlocked except on the destruction of the handle.

Heretofore in the making of bailed handles the bails are put into the handle straight and then bent to the angle desired. The bails are generally tined before assembling with the handle and on the bending of the bails this tined surface breaks off. To obviate this difficulty I have provided a construction in which the bails are first bent to the shape desired, then tined and pushed into the handle and automatically locked in place.

A further feature of the invention is that if the handle should be burned off or broken the bails may be readily supplied with a new handle.

The invention further consists in the several features hereinafter described.

Figure 1:
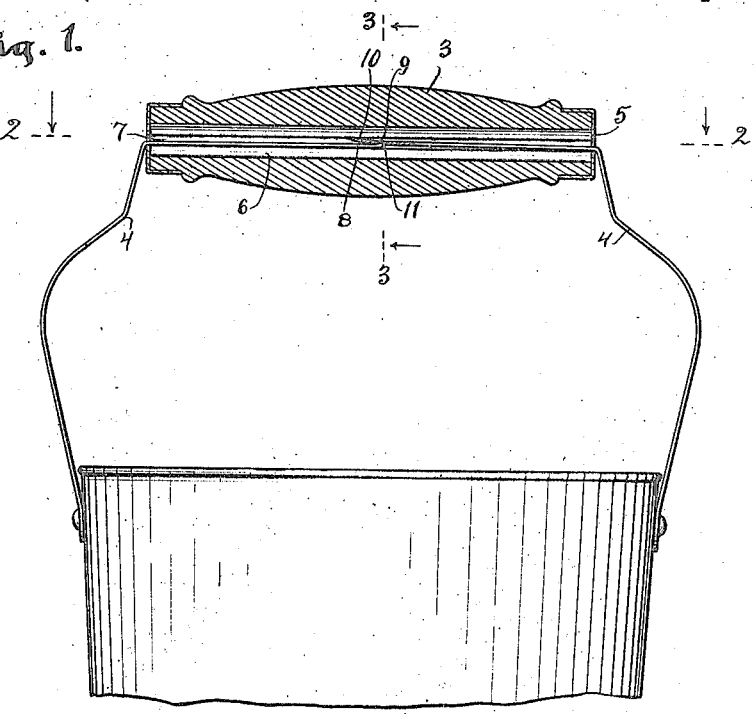
Figure 1 is a view of the device embodying the invention, showing it applied to a pail, parts being shown in section.
Figure 2:
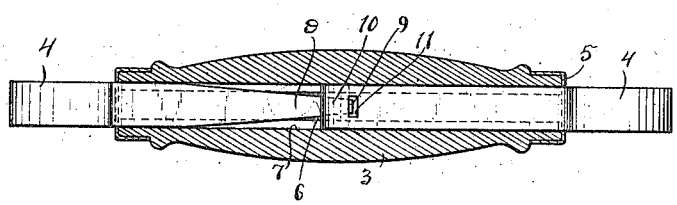
Fig. 2 is a section taken on the line 2—2 of Fig. 1.
Figure 3:
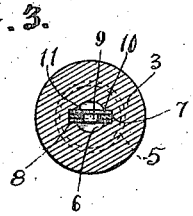
Fig. 3 is a section taken on the line 3—3 of Fig. 1.

In general the device comprises the handle member 3, bails 4 and a connection between the bails within the handle.

The handle 3 is provided with the usual ferrules 5 and has a longitudinally extending bore 6 therein with alined slots 7.

One of the bails 4 is provided with a tapered end 8 having an upwardly projecting tongue 9 while the other bail has one end 10 bent upwardly and provided with a slot 11. The bails are made of metal which is more or less elastic. The portion of the end 8 near the tongue is of such a width as to permit its downward movement into the recess formed by the bore 6 below the slots 7.

The bails are bent to the required shape and then secured to the handle 3 by inserting the ends into the slots 7 in the handle with the tongue 9 and end 10 on the same side and in pushing these ends against each other the tongue 7 passes down the inclined side 12 of the end 10 into the bore 6 and then snaps upwardly into the slot 11 from which it can not be withdrawn as the bails are bent at an angle to the handle.

The drawing shows the bails 4 secured to a pail but it will be understood that this device may be used in connection with coffee and tea pots, tea-kettles and other utensils.

The invention thus exemplifies a simple and efficient construction well adapted for the purpose described.

What I claim as my invention is:

1. In a device of the character described, the combination of a handle having a hollow therein, bails having their ends insertible within the hollow of the handle, and a snap locking connection between said bails within said handle, the bails being automatically locked together on their insertion within the handle.

2. In a device of the character described, the combination of a handle having a hollow therein, bails having their ends insertible within the hollow of the handle, a tongue on the end of one bail, the end of the other bail having an opening therein to receive the tongue to automatically lock the bails together when said bails are pressed toward each other within the handle.

3. In a device of the character described, the combination of a handle having a bore therein and alined slots, bails slidable within said slots, a tongue on the end of one bail, the end of the other bail being bent upwardly and provided with an opening, the ends of said bails being secured within the handle by pushing them toward each other, said tongue being pressed downwardly by the bent up end of the other bail and allowed to snap into the opening in said bail.

In testimony whereof, I affix my signature.

ADAM W. KAUFMAN.

Copies of this patent may be obtained for five cents each, by addressing the "Commissioner of Patents, Washington, D. C."